United States Patent
Shin et al.

(10) Patent No.: US 11,158,901 B2
(45) Date of Patent: Oct. 26, 2021

(54) LITHIUM SECONDARY BATTERY PACK INCLUDING THERMAL EXPANSION TAPE FIXING POUCH TYPE BATTERY CELLS AND METHOD OF MANUFACTURING SAME

(71) Applicant: LG Chem, Ltd., Seoul (KR)

(72) Inventors: Jin-Young Shin, Daejeon (KR); Dong-Wook Sung, Daejeon (KR); So-Mi Jeong, Daejeon (KR); Dae-Sung Jang, Daejeon (KR)

(73) Assignee: LG Chem, Ltd.

( * ) Notice: Subject to any disclaimer, the term of this patent is extended or adjusted under 35 U.S.C. 154(b) by 296 days.

(21) Appl. No.: 16/335,045

(22) PCT Filed: Jan. 9, 2018

(86) PCT No.: PCT/KR2018/000442
§ 371 (c)(1),
(2) Date: Mar. 20, 2019

(87) PCT Pub. No.: WO2018/151415
PCT Pub. Date: Aug. 23, 2018

(65) Prior Publication Data
US 2019/0280263 A1    Sep. 12, 2019

(30) Foreign Application Priority Data
Feb. 16, 2017    (KR) .................. 10-2017-0021199

(51) Int. Cl.
*H01M 50/209*    (2021.01)
*H01M 10/052*    (2010.01)
(Continued)

(52) U.S. Cl.
CPC ....... *H01M 50/209* (2021.01); *H01M 10/052* (2013.01); *H01M 10/42* (2013.01);
(Continued)

(58) Field of Classification Search
CPC .... H01M 50/209; H01M 50/30; H01M 50/10; H01M 50/20; H01M 10/052; H01M 10/42; H01M 10/425
(Continued)

(56) References Cited

U.S. PATENT DOCUMENTS 9,425,479 B2    8/2016    Kim
9,508,969 B2    11/2016    Yang et al.
(Continued)

FOREIGN PATENT DOCUMENTS

CA    2865636 A1    5/2015
CN    101689617 A    3/2010
(Continued)

OTHER PUBLICATIONS

International Search Report for PCT/KR2018/000442, dated May 18, 2018.
(Continued)

*Primary Examiner* — Sean P Cullen
(74) *Attorney, Agent, or Firm* — Lerner, David, Littenberg, Krumholz & Mentlik, LLP

(57) ABSTRACT

The present invention relates to a safety-improved battery cell including a thermal expansion tape and a method of manufacturing the same, wherein a battery pack including multiple battery cells is configured such that heat generated during a charging/discharging process and internal gas generated thereby are discharged to outside of a battery cell by employing a thermal expansion tape. Thus, the present invention can improve safety of a pouch-type secondary battery pack by discharging gas generated in a pouch-type secondary battery. In addition, the present invention utilizes pressure of gas generated in the secondary battery and thus can be operable without provision of a separate device and an external power source. Moreover, the present invention
(Continued)

can perform repetitive gas discharge due to a configuration of a fixing unit having thermal expansion properties.

11 Claims, 6 Drawing Sheets

(51) Int. Cl.
  *H01M 10/42* (2006.01)
  *H01M 50/10* (2021.01)
  *H01M 50/20* (2021.01)
  *H01M 50/30* (2021.01)
(52) U.S. Cl.
  CPC ......... *H01M 10/425* (2013.01); *H01M 50/10* (2021.01); *H01M 50/20* (2021.01); *H01M 50/30* (2021.01); *H01M 2010/4271* (2013.01)
(58) Field of Classification Search
  USPC .................................. 429/82, 156, 158, 159
  See application file for complete search history.

(56) References Cited

U.S. PATENT DOCUMENTS

| | | | |
|---|---|---|---|
| 9,748,533 | B2 | 8/2017 | Kim et al. |
| 9,991,485 | B2 | 6/2018 | Seong et al. |
| 2010/0183910 | A1* | 7/2010 | Nishino ............ H01M 10/0431 |
| | | | 429/163 |
| 2011/0151312 | A1 | 6/2011 | Kim |
| 2012/0164490 | A1 | 6/2012 | Itoi et al. |
| 2014/0011060 | A1 | 1/2014 | Yang et al. |
| 2014/0113167 | A1 | 4/2014 | Itoi et al. |
| 2015/0093608 | A1 | 4/2015 | Seong et al. |
| 2015/0140369 | A1 | 5/2015 | Itoi et al. |
| 2015/0147602 | A1 | 5/2015 | Bianchi et al. |
| 2015/0147638 | A1* | 5/2015 | Tamura ................ H01M 50/183 |
| | | | 429/179 |
| 2015/0221909 | A1* | 8/2015 | Maruoka ................ H02J 7/0042 |
| | | | 320/112 |
| 2016/0226036 | A1 | 8/2016 | Kim et al. |
| 2017/0047564 | A1 | 2/2017 | Bianchi et al. |
| 2019/0296302 | A1 | 9/2019 | Bianchi et al. |

FOREIGN PATENT DOCUMENTS

| | | |
|---|---|---|
| CN | 102473884 A | 5/2012 |
| CN | 104396046 A | 3/2015 |
| CN | 104620415 A | 5/2015 |
| JP | 2011071097 A | 4/2011 |
| JP | 2012190734 A | 10/2012 |
| JP | 2014232666 A | 12/2014 |
| JP | 5993209 B2 | 9/2016 |
| KR | 100864694 B1 | 10/2008 |
| KR | 20090020888 A | 2/2009 |
| KR | 20110072910 A | 6/2011 |
| KR | 20110108006 A | 10/2011 |
| KR | 20130117637 A | 10/2013 |
| KR | 20140023756 A | 2/2014 |
| KR | 20140119007 A | 10/2014 |
| KR | 20150023113 A | 3/2015 |
| KR | 20160075468 A | 6/2016 |
| KR | 20160095439 A | 8/2016 |

OTHER PUBLICATIONS

Chinese Search Report for Application No. 201880003440.9, dated Mar. 25, 2021, 3 pages.

* cited by examiner

LITHIUM SECONDARY BATTERY PACK INCLUDING THERMAL EXPANSION TAPE FIXING POUCH TYPE BATTERY CELLS AND METHOD OF MANUFACTURING SAME

CROSS-REFERENCE TO RELATED APPLICATIONS

This application is a national phase entry under 35 U.S.C. § 371 of International Application No. PCT/KR2018/000442, filed on Jan. 9, 2018, published in Korean, which claims priority to Korean Patent Application No. 10-2017-0021199, filed on Feb. 16, 2017, the disclosures of which are hereby incorporated herein by reference.

TECHNICAL FIELD

The present invention relates generally to a safety-improved battery cell including a thermal expansion tape and a method of manufacturing the same. More particularly, the present invention relates to a safety-improved battery cell including a thermal expansion tape and a method of manufacturing the same, wherein a battery pack including multiple battery cells is configured such that heat generated during a charging/discharging process and internal gas generated thereby are discharged to outside of a battery cell by employing a thermal expansion tape.

BACKGROUND ART

In general, representative examples of a secondary battery include a nickel-cadmium battery, a nickel-metal hydride battery, a lithium-ion battery, a lithium-ion polymer battery, etc. The applications for such a secondary battery are not only for small-sized products such as a digital camera, a P-DVD, an MP3P, a mobile phone, a PDA, a portable game device, a power tool, an E-bike, etc. but also large-sized products requiring high output such as electric vehicles, hybrid vehicles, etc., power storage devices for storing new and renewable energy and surplus power, and backup power storage devices.

Meanwhile, a large-capacity battery used in electric vehicles, hybrid vehicles, power storage devices, etc. includes multiple unit cell assemblies that are connected to each other in series and/or in parallel. The battery configured with the multiple unit cells that are connected to each other is placed in a battery pack and repeats a charge/discharge process, so that states of each unit cell and the battery pack have to be controlled.

A lithium secondary battery may be manufactured in various types depending on the shape. A representative type of the lithium secondary battery may include a cylindrical type, a prismatic type, a pouch type, etc. In particular, a pouch-type secondary battery employs a flexible casing, i.e., a pouch, and thus is relatively free in shape. In addition, the pouch-type secondary battery is easy to manufacture and is cost-effective, so that it is growing in popularity in the secondary battery industry.

However, such a pouch-type secondary battery is manufactured by adding organic solvents and plasticizers to improve output or capacity characteristics. When the pouch-type secondary battery is overcharged during charging and discharging or is shorted internally due to defects, the cell temperature rapidly rises, which causes flammable gas to be generated in the cell and results in a swelling phenomenon wherein the pouch swells. In order to prevent such a swelling phenomenon, the gas in the pouch has to be appropriately moved or discharged. In particular, research is underway to solve this problem without adding additional components for gas discharge to components of a general battery pack.

It is noted that Korean Patent Application Publication No. 10-2016-0095439 (Aug. 11, 2016) disclosed a battery module including: a secondary battery unit including multiple secondary batteries arranged horizontally and vertically at predetermined intervals, and each having an electrode terminal and a safety vent, the electrode terminal and the safety vent being disposed at a side of each of the secondary batteries; a pressing plate for enclosing an outer surface of the secondary battery unit in a band shape and pressing the secondary battery unit at a predetermined pressure; a duct communicating with the safety vent and allowing gas discharged from the safety vent to flow to a first position; and an insulating cover having a vent hole member coupled to the insulating cover to communicate with the duct at the first position.

It is noted that Japanese Patent Application Publication No. 2011-071097 (Apr. 7, 2011) disclosed a secondary battery device including: multiple battery cells each having an upper surface provided with a cell terminal, a lower surface opposed to the upper surface, and a side surface connecting the upper surface and the lower surface to each other; a first supporting frame having a first concave portion supporting each of the multiple battery cells arranged such that the cell terminals are arranged on a straight line and positioned on the same plane, and engaged with the upper surface of each of the battery cells, the first supporting frame having an opening to allow the cell terminal of the battery cell to be exposed; a second supporting frame having a second concave portion supporting each of the multiple battery cells and engaged with the lower surface of each of the battery cells; a third supporting frame having a cylindrical portion supporting the side surface of each of the battery cells; a busbar electrically connecting to the cell terminal of each of the battery cells exposed from the opening of the first support frame; and an outer casing having a bottom portion opposed to the second supporting frame supporting the multiple battery cells, and a side wall erected at the bottom portion and coupled to the first supporting frame while enclosing the third supporting wall.

It is noted that Japanese Patent NO. 5993209 (Aug. 26, 2016) disclosed a battery cooling structure configured such that a battery pack including multiple unit cells is accommodated in a container and a casing has an air inlet to allow cooling air to be introduced into the casing and an air outlet to discharge the cooling air, whereby the battery pack is cooled by the cooling air, wherein the unit cell is a lithium-ion secondary battery or a nickel-metal hydride secondary cell, and the air inlet or the air outlet is provided with a refractory closing member that expands by heat when a fire occurs to close the air inlet or the air outlet. The refractory closing member is made of a thermal expansion refractory resin material containing an expansion material having an expansion starting temperature of equal to or less than 270 degrees, and a duct member is connected to the air inlet or the air outlet. The refractory closing member has a cylindrical portion disposed to surround the circumferential surface of the air inlet or the air outlet, and the cylindrical portion of the refractory closing member is interposed between the air inlet or the air outlet and the duct member.

It is noted that Korean Patent Application Publication No. 10-2013-0117637 (Oct. 28, 2013) disclosed a secondary battery including: an electrode assembly having an electrode tab; an electrode lead attached to the electrode tab and having at least one lead hole; a pouch casing accommodating the electrode assembly such that the electrode lead protrudes outside the pouch casing; and a sealing tape having a venting pattern formed in a region corresponding to the lead hole and interposed between the electrode lead and an inner surface of the pouch casing.

However, a safety-improved battery cell, which includes a thermal expansion tape and is configured to efficiently control internal temperature and gas discharge of a battery cell, and a battery pack without provision of a separate gas discharging device so as to improve stability of the battery pack and improve a charging/discharging performance thereof, and a method of manufacturing the same have not been proposed.

Documents of Related Art (Patent Document 0001) Korean Patent Application Publication No. 10-2016-0095439 (Aug. 11, 2016)

(Patent Document 0002) Japanese Patent Application Publication No. 2011-071097 (Apr. 7, 2011)

(Patent Document 0003) Japanese Patent No. 5993209 (Aug. 26, 2016)

(Patent Document 0004) Korean Patent Application Publication No. 10-2013-0117637 (Oct. 28, 2013)

DISCLOSURE

Technical Problem

Accordingly, the present invention has been made keeping in mind the above problems occurring in the related art, and the present invention provides a safety-improved battery cell including a thermal expansion tape and a method of manufacturing the same, in which a device capable of discharging gas generated in a pouch-type secondary battery is provided.

Further, the present invention provides a manufacturing method, in which gas in a battery cell is discharged without provision of additional components in a process of manufacturing a lithium secondary battery pack.

Further, the present invention provides a battery cell fixing unit having physical and chemical stability for temperature control of a battery pack and discharge of gas generated in the battery pack according to a charging/discharging performance of a pouch-type lithium secondary battery.

Technical Solution

In order to achieve the above objects, according to one aspect of the present invention, there is provided a method of manufacturing a lithium secondary battery pack, the method including: a first step of forming a pouch-type battery cell configured such that an electrode assembly and an electrolyte are sealed in a pouch, and a positive electrode tab and a negative electrode tab protrude outside the pouch through a side of the pouch; a second step of stacking multiple pouch-type battery cells formed in the first step; a third step of fixing the multiple pouch-type battery cells of the second step using a fixing unit to form a unit module; and a fourth step of arranging multiple unit modules formed in the third step in a module casing, wherein the fixing unit has a function of discharging gas in the pouch-type battery cell when temperature of the battery cell rises.

Further, the fixing unit may have thermal expansion properties.

Further, the fixing unit may be a thermal expansion polymer.

Further, the fixing unit may have one more shapes of a tape shape, a band shape, a tube shape, or a box shape.

Further, a protection circuit or a PTC circuit may be formed on a surface of the unit module in the third step.

Further, the thermal expansion polymer may be composed of any one selected from the group consisting of PE, PP, PS, PVC, acrylic, and a butyl resin.

Further, the function of discharging the gas in the pouch-type battery cell by the fixing unit is performed at a temperature of the battery cell of equal to or greater than 80° C.

Further, the fixing unit may be composed of a composite structure including the thermal expansion polymer and expansion graphite.

Further, an expansion pressure of the fixing unit may be 0.2 to 1.5 N/mm2.

Further, there may be provided a device including a secondary battery that is manufactured by the method of manufacturing the lithium secondary battery pack.

Further, the device may be selected from the group consisting of an electronic device, an electric vehicle, a hybrid vehicle, and a power storage device.

According to another aspect of the present invention, there is provided a lithium secondary battery pack, including: a pouch-type battery cell configured such that an electrode assembly and an electrolyte are sealed in a pouch and a positive electrode tab and a negative electrode tab protrude outside the pouch through a side of the pouch; a unit module formed by stacking multiple pouch-type battery cells and fixing the multiple pouch-type battery cells using a fixing unit; and a module casing having multiple unit modules arranged therein, wherein the fixing unit has a function of discharging gas in the pouch-type battery cell when temperature of the battery cell rises.

Further, the fixing unit may have thermal expansion properties.

Further, the fixing unit may be at least one band-shaped tape including thermal expansion graphite.

BEST MODE

Figure 1:
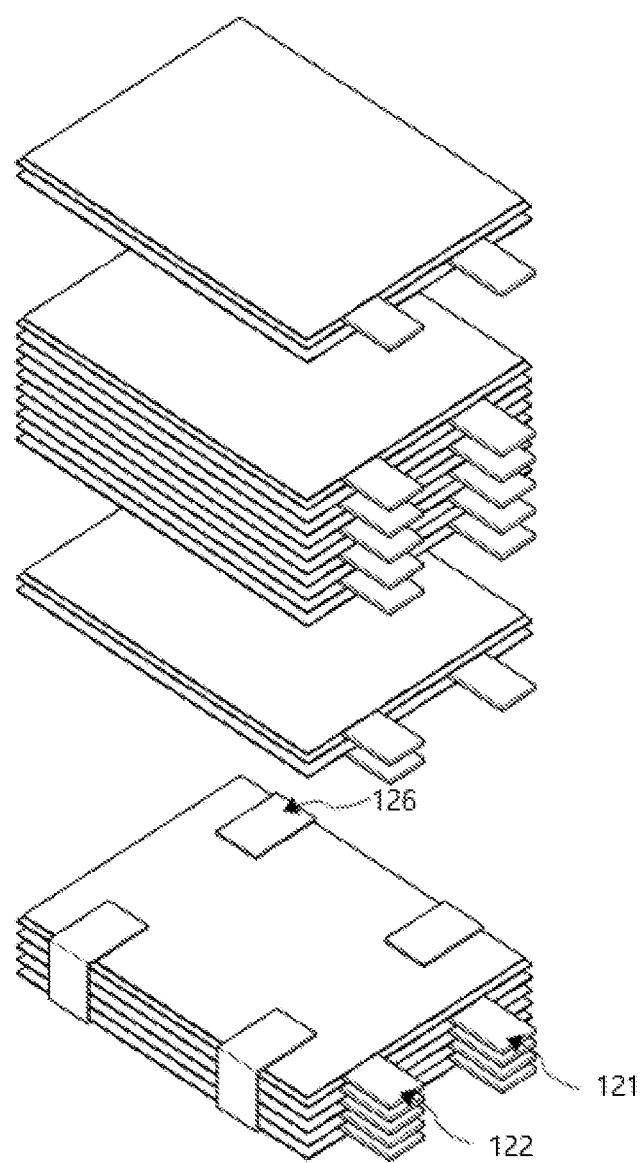
FIG. 1 is a view showing an exemplary pouch-type electrode assembly in the related art.
Figure 2:
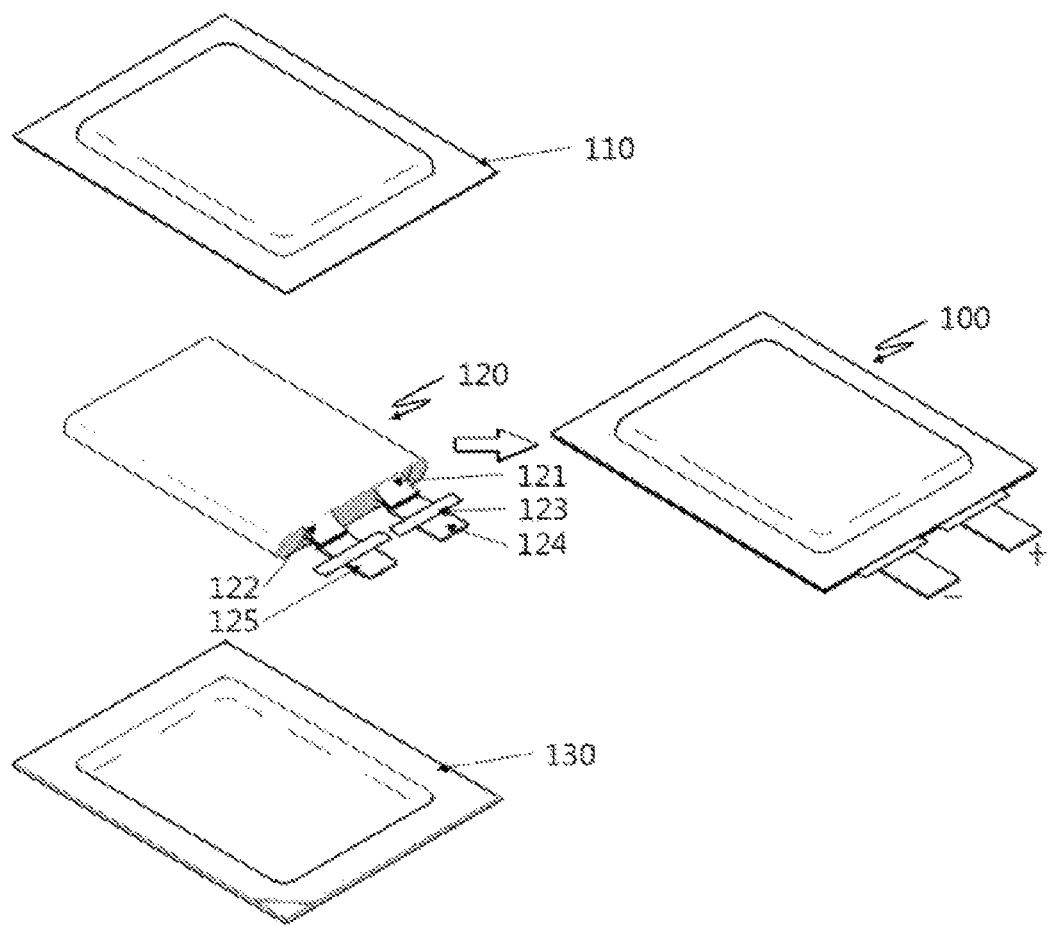
FIG. 2 is a view showing an exemplary pouch-type battery cell in the related art.
Figure 3:
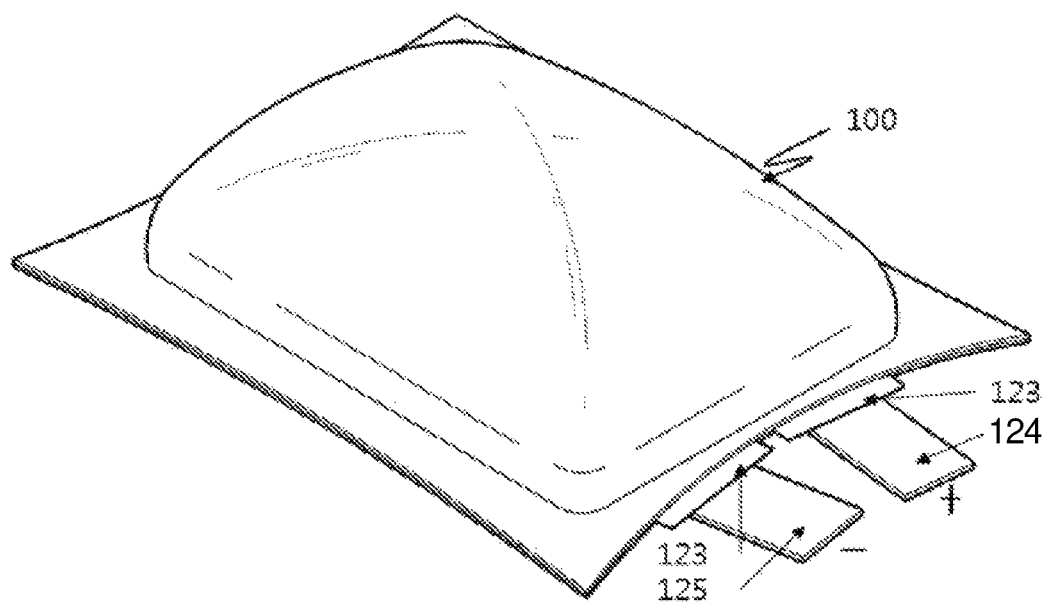
FIG. 3 is a view showing volume expansion of the exemplary pouch-type battery cell due to gas generation.

Hereinbelow, exemplary embodiments of the present invention will be described in detail with reference to the accompanying drawings such that the invention can be easily embodied by one of ordinary skill in the art to which this invention belongs. In describing an operational principle relating to the exemplary embodiments of the present invention, however, it is to be noted that, when the functions of conventional elements and the detailed description of elements related with the present invention may make the gist of the present invention unclear, a detailed description of those elements will be omitted.

Furthermore, throughout the drawings, the same reference numerals will refer to like elements having like functions. Throughout the specification, when it is described that one element is connected to the other element, the one element may be directly connected to the other element or indirectly connected to the other element through a third element. Furthermore, when it is described that one element includes another element, it means that the one element does not exclude another element, but may include other elements, unless otherwise described.

The present invention will be described in detail in connection with exemplary embodiments with reference to the accompanying drawings.

There is provided a method of manufacturing a lithium secondary battery pack, the method including: a first step of forming a pouch-type battery cell configured such that an electrode assembly and an electrolyte are sealed by a pouch, and a positive electrode tab and a negative electrode tab protrude outside the pouch from a side of the pouch; a second step of stacking multiple pouch-type battery cells formed in the first step; a third step of fixing the multiple pouch-type battery cells of the second step using a fixing unit to form a unit module; and a fourth step of arranging multiple unit modules formed in the third step in a module casing, wherein the fixing unit has a function of discharging gas in the pouch-type battery cell when the temperature of the battery cell rises.

A pouch-type secondary battery including a fixing unit having thermal expansion properties according to the present invention includes: a pair of pouch-type cells each configured such that an electrode assembly is sealed by a pouch and a positive electrode tab and a negative electrode tab protrude outside from an upper side of the pouch, the pair of pouch-type cells being arranged in parallel in a stacked manner; a cell casing assembled to seal the pouches of the pouch-type cells; and multiple pouch-type cell modules stacked in parallel.

Each of the pouch-type cell modules is configured such that the pouch encloses an outer surface of the electrode assembly of each of the pouch-type cells and thus the electrode assembly is sealed by the pouch. Furthermore, the positive electrode tab and the negative electrode tab that extend to a side of the electrode assembly protrude outside the pouch. In other words, the pouch-type cell is configured such that the positive electrode tab and the negative electrode tab extend to the side of the electrode assembly, and the pouch encloses the electrode assembly to seal only the electrode assembly except for the positive electrode tab and the negative electrode tab. The pair of pouch-type cells configured as described above are stacked in parallel, and the cell casing assembled to seal the pouches of the pouch-type cells encloses outer surfaces of the pouches.

In other words, portions of the pouch-type cells enclosed by the pouches except for the positive electrode tabs and the negative electrode tabs are enclosed by the cell casing again to be sealed by the cell casing. Herein, it is preferable that the cell casing is formed so as not to be in close contact with the pouches such that a predetermined space is secured in the cell casing.

The pouch-type cell module is configured such that the positive electrode tabs and the negative electrode tabs protrude outside the cell casing, and the electrode assemblies are sealed by the pouches and sealed again by the cell casing enclosing the outer surfaces of the pouches, thus having a double sealing structure.

Herein, the electrode assembly of the pouch-type cell is composed of a positive electrode, a negative electrode, an electrolyte, and a separator separating the positive electrode and the negative electrode whereby electricity is charged and discharged. The positive electrode tab and the negative electrode tab transmit a current generated from the electrode assembly at the time of discharging or a current introduced from outside at the time of charging.

The pouch-type cell module is configured such that multiple pouch-type cell modules are stacked in parallel, and the positive electrode tabs and the negative electrode tabs that protrude outside the cell casing may be configured such that a pair of positive electrode tabs of one pouch-type cell module are coupled together, and negative electrode tabs of pouch-type cell modules adjacent to each other are coupled together, thus being connected to each other in series or in parallel.

Herein, the positive electrode tabs and the negative electrode tabs may be coupled to each other by using connectors, or connective plates, or may be coupled to each other by laser beam welding or ultrasonic welding. The multiple pouch-type cell modules are provided as described above, and a gas outlet may be formed at a side of the cell casing of each of the pouch-type cell modules.

Furthermore, the fixing unit may have thermal expansion properties.

Furthermore, the fixing unit may be an organic and/or inorganic material having thermal expansion properties.

Furthermore, the fixing unit may be expansion graphite having thermal expansion properties.

Furthermore, the fixing unit may be a thermal expansion polymer.

The thermal expansion polymer may be one or at least two polymers of PE, PP, PS, PVC, acrylic, and a butyl resin.

The physical property data of the thermal expansion polymer under consideration is shown in Table 1.

TABLE 1

| No. | 1 | 2 | 3 |
|---|---|---|---|
| Comp. | Butyl based | Epoxy based | PVC based |
| Expansion Temp. (° C.) | 200 | 150-200 | 200 |
| Expansion Ratio (times) | 10 | 30 | 20 |
| Thickness (mm) | 1.0-6.0 | 1.0-2.0 | 1.0-2.0 |
| Expansion Pressure (N/mm²) | N.A | 0.38-0.47 | 0.31 |
| Thermal conductivity (W/m · k) | Before Expansion: 0.46 After Expansion: 0.22 | Before Expansion: 0.49 After Expansion: 0.29 | Before Expansion: 0.28 After Expansion: 0.23 |
| Electrolyte resistance | N.A | No Change | No Change |

Furthermore, the fixing unit may have one or at least two shapes of a tape shape, a band shape, a tube shape, and a box shape.

The fixing unit having one or at least two shapes of the tape shape, the band shape, the tube shape, and the box shape may be in contact with the stacked battery cells in the third step.

A thermoplastic pressure-sensitive adhesive may be formed on the surface of the fixing unit that is in contact with the stacked battery cells.

The thermoplastic pressure-sensitive adhesive may be any one selected from the group consisting of PE (polyethylene), PP (polypropylene), PS (polystyrene), PVC (polyvinyl chloride), nylon (polyamide), and PET (polyethylene terephthalate).

Furthermore, a protection circuit or a PTC circuit may be formed on a surface of the unit module in the third step.

Furthermore, the thermal expansion polymer may be composed of any one selected from the group consisting of PE, PP, PS, PVC, acrylic, and a butyl resin.

Furthermore, the function of discharging the gas in the pouch-type battery cell by the fixing unit may be performed at a temperature of the battery cell of equal to or greater than 80° C., and preferably at a temperature of the battery cell of equal to or greater than 150° C.

Furthermore, the fixing unit may be composed of a composite structure including the thermal expansion polymer and the expansion graphite.

Furthermore, an expansion pressure of the fixing unit may be 0.2 to 1.5 N/mm2.

When a weight ratio of the polymer to metal is out of a predetermined range, fixing of the battery cell may become dysfunctional or gas discharge may not be efficiently performed.

Furthermore, there may be provided an electronic device to which the method of manufacturing the lithium secondary battery pack according to any one of the above methods is applied.

Furthermore, there may be provided an electric vehicle to which the method of manufacturing the lithium secondary battery pack according to any one of the above methods is applied.

Furthermore, there may be provided a hybrid vehicle to which the method of manufacturing the lithium secondary battery pack according to any one of the above methods is applied.

Furthermore, there may be provided a power storage device to which the method of manufacturing the lithium secondary battery pack according to any one of the above methods is applied.

Furthermore, there may be provided a lithium secondary battery pack including: a pouch-type battery cell configured such that an electrode assembly and an electrolyte are sealed by a pouch and a positive electrode tab and a negative electrode tab protrude outside the pouch from a side of the pouch; a unit module formed by stacking multiple pouch-type battery cells and fixing the multiple pouch-type battery cells using a fixing unit; and a module casing having multiple unit modules arranged therein, wherein the fixing unit has a function of discharging gas in the pouch-type battery cell when the temperature of the battery cell rises.

Furthermore, the fixing unit may have thermal expansion properties.

Furthermore, the fixing unit may be at least one band-shaped tape composed of a thermal expansion polymer.

The thermal expansion polymer may be one or at least two polymers of PE, PP, PS, PVC, acrylic, and a butyl resin.

The fixing unit may be thermal expansion metal.

(Embodiment)

Figure 4:
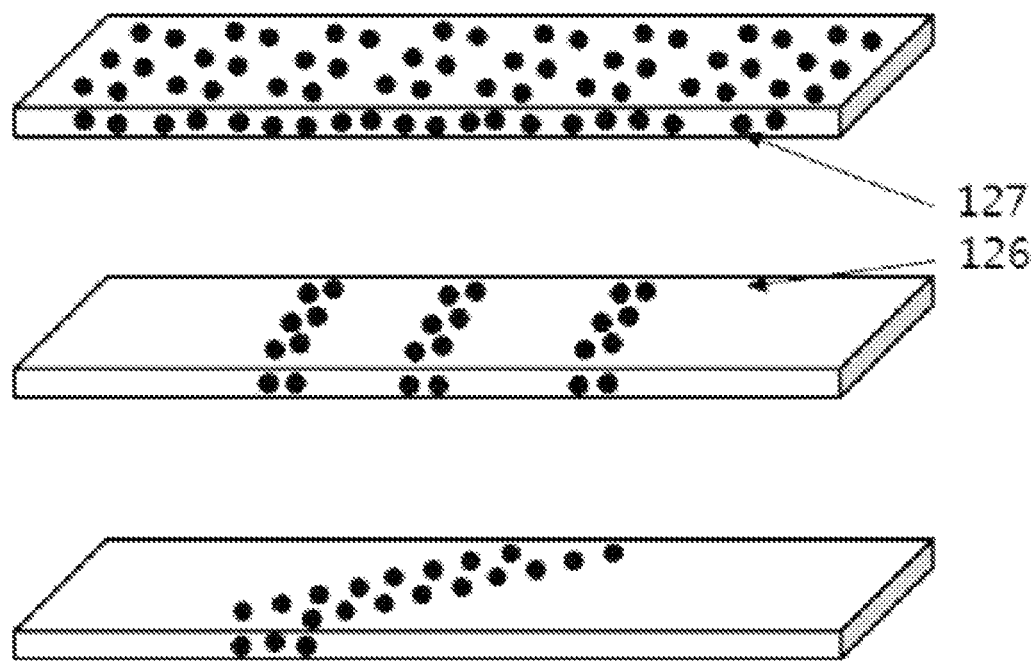
FIG. 4 is a view showing expansion graphite formed in a fixing unit according to an embodiment of the present invention.

FIG. 4 is a view showing expansion graphite formed in a fixing unit according to an embodiment of the present invention.

Figure 5:
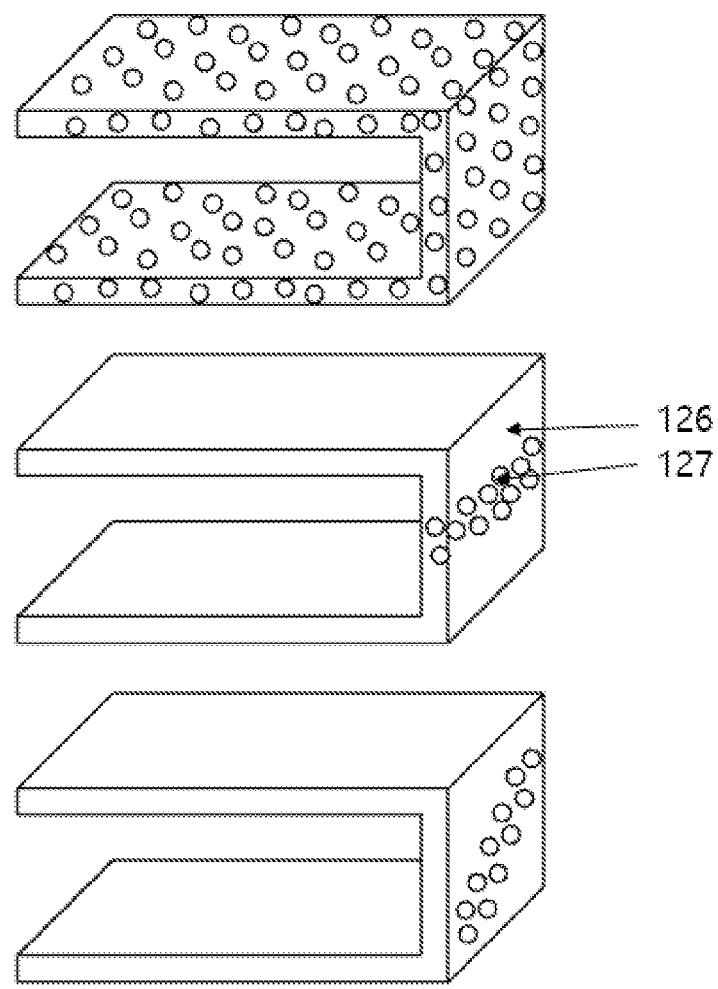
FIG. 5 is a view showing expansion graphite formed in a band-shaped fixing unit according to an embodiment of the present invention.

FIG. 5 is a view showing expansion graphite formed in a band-shaped fixing unit according to an embodiment of the present invention.

The expansion graphite formed in the fixing unit according to the embodiment of the present invention may be formed in various shapes. FIG. 4 shows that a shape where the expansion graphite is uniformly distributed throughout the fixing unit, a shape where the expansion graphite is formed in a specific region transversally in a strip shape, and a shape where the expansion graphite is formed in a specific region diagonally in a strip shape. However, it is obvious that the present invention is not limited to the above formation shapes as long as the fixing unit exhibits the effect of discharging gas generated in the secondary battery in an abnormal state of the secondary battery.

The expansion graphite formed in the band-shaped fixing unit according to the embodiment of the present invention may be formed in various shapes. FIG. 5 shows that a shape where the expansion graphite is uniformly distributed throughout the fixing unit, a shape where the expansion graphite is formed in a specific region transversally in a strip shape, and a shape where the expansion graphite is formed in a specific region diagonally in a strip shape. However, it is obvious that the present invention is not limited to the above formation shapes as long as the fixing unit exhibits the effect of preventing a current from flowing in an abnormal state of the secondary battery.

Figure 6:
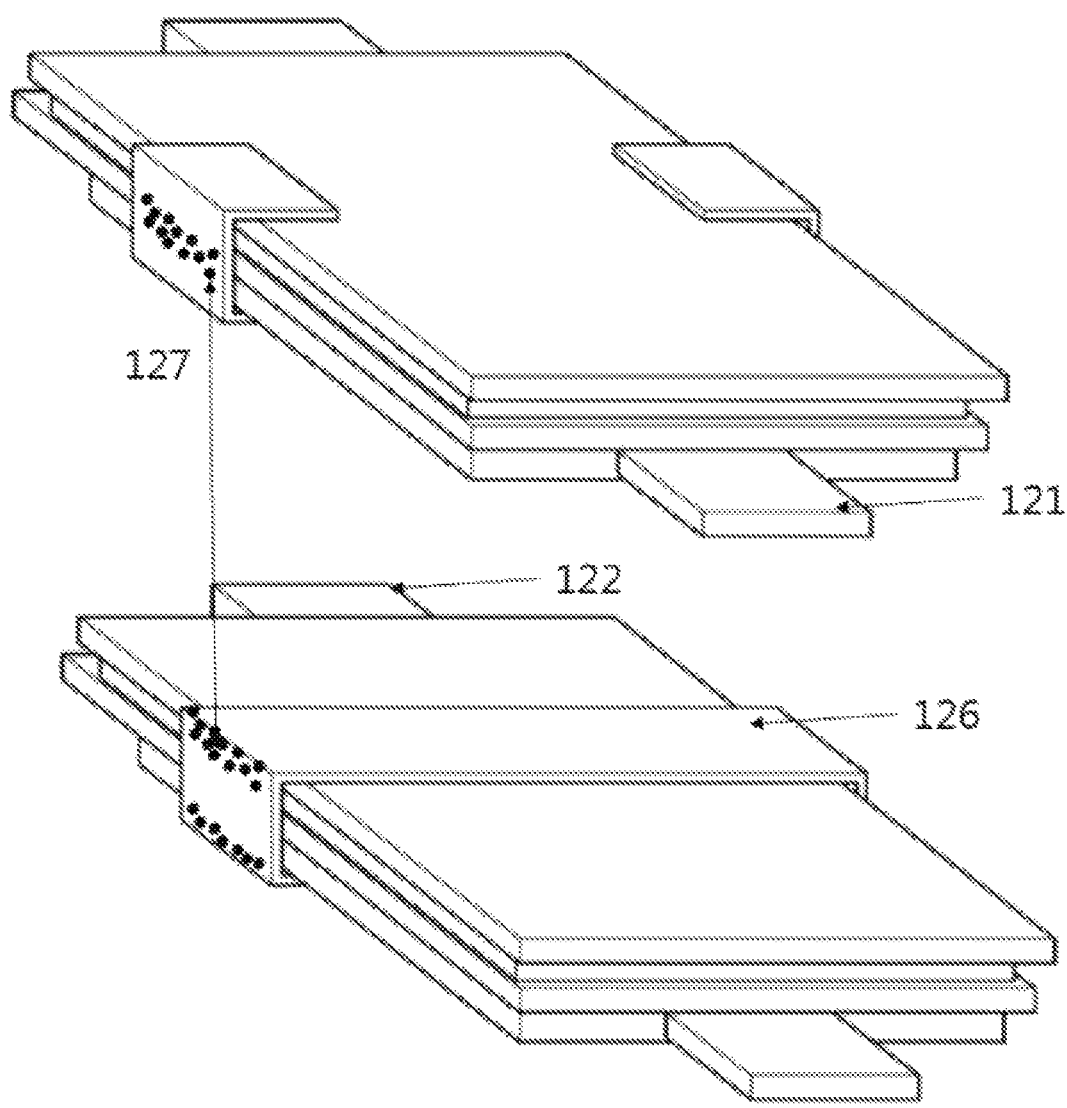
FIG. 6 is a view showing an electrode assembly that employs bi-directional electrode tabs and includes a fixing unit having expansion graphite formed therein according to an embodiment of the present invention.

FIG. 6 is a view showing an electrode assembly that employs bi-directional electrode tabs and includes a fixing unit having expansion graphite formed therein according to an embodiment of the present invention. It is obvious that the electrode assembly including the fixing unit also employs unidirectional electrode tabs.

While the exemplary embodiments of the invention have been described above, the embodiments are only examples of the invention, and it will be understood by those skilled in the art that the invention can be modified in various forms without departing from the technical spirit of the invention. Therefore, the scope of the invention should be determined on the basis of the descriptions in the appended claims, not any specific embodiment, and all equivalents thereof should belong to the scope of the invention.

DESCRIPTION OF THE REFERENCE NUMERALS IN THE DRAWINGS

100: battery cell
110: upper pouch
120: electrode assembly
121: positive electrode tab
122: negative electrode tab
123: insulating tape
124: positive electrode lead
125: negative electrode lead
126: fixing unit
127: expansion graphite
130: lower pouch

INDUSTRIAL APPLICABILITY

According to a safety-improved battery cell including a thermal expansion tape and a method of manufacturing the same according to the present invention, it is possible to improve safety of a pouch-type secondary battery pack by discharging gas generated in the pouch-type secondary battery.

Further, the present invention utilizes the pressure of gas generated in a secondary battery and thus can be operable without provision of a separate device and an external power source.

Further, the present invention can perform repetitive gas discharge due to the configuration of a fixing unit having thermal expansion properties.

Further, the present invention includes a fixing unit that fixes multiple pouch-type cell modules arranged in parallel in a stacked manner, whereby when flammable gas is generated when the pouch-type cell is shorted internally or overcharged and too much flammable gas is discharged upon bursting of the pouch, the flammable gas can be rapidly discharged. Accordingly, the temperature and voltage of the pouch-type cell module can be stabilized, thereby reducing possibility of ignition or explosion of a battery module configured with multiple pouch-type battery cells.

The invention claimed is:

1. A method of manufacturing a lithium secondary battery pack, the method comprising:
    forming multiple pouch-type battery cells each configured such that an electrode assembly and an electrolyte are sealed in a pouch and a positive electrode tab and a negative electrode tab protrude outside the pouch through a side of the pouch;
    stacking the multiple pouch-type battery cells;
    fixing the multiple pouch-type battery cells using a fixing unit to form multiple unit modules the fixing unit having a composite structure including a thermal expansion polymer and expansion graphite, the fixing unit having one or more of a tape shape, a band shape, a tube shape, or a box shape, the expansion graphite being formed in a specific region of the fixing unit in a strip shape; and
    arranging the multiple unit modules in a module casing,
    wherein the fixing unit is configured to discharge gas in the pouch-type battery cells when a temperature of the battery cells rises.

2. The method of claim 1, wherein the fixing unit has thermal expansion properties.

3. The method of claim 1, wherein the thermal expansion polymer is composed of any one selected from the group consisting of PE, PP, PS, PVC, acrylic, and a butyl resin.

4. The method of claim 1, wherein the fixing unit is configured to discharge the gas in the pouch-type battery cell when the temperature of the battery cells is equal to or greater than 80° C.

5. The method of claim 1, wherein an expansion pressure of the fixing unit is 0.2 to 1.5 N/mm$^2$.

6. The method of claim 1, wherein a protection circuit or a PTC circuit is formed on a surface of each unit module.

7. A device including the lithium secondary battery pack that is manufactured by the method of claim 1.

8. The device of claim 7, wherein the device is selected from the group consisting of an electronic device, an electric vehicle, a hybrid vehicle, and a power storage device.

9. A lithium secondary battery pack, comprising:
    multiple pouch-type battery cells each including an electrode assembly and an electrolyte sealed in a pouch and a positive electrode tab and a negative electrode tab each protruding outside the pouch through a side of the pouch;
    multiple unit modules each formed by stacking the multiple pouch-type battery cells and fixing the multiple pouch-type battery cells using a fixing unit, the fixing unit having a composite structure including a thermal expansion polymer and expansion graphite, the fixing unit having one or more of a tape shape, a band shape, a tube shape, or a box shape, the expansion graphite being formed in a specific region of the fixing unit in a strip shape; and
    a module casing having the multiple unit modules arranged therein,
    wherein the fixing unit is configured to discharge gas in the pouch-type battery cells when a temperature of the battery cells rises.

10. The lithium secondary battery pack of claim 9, wherein the fixing unit has thermal expansion properties.

11. The lithium secondary battery pack of claim 10, wherein the fixing unit is a band-shaped tape.

* * * * *